United States Patent [19]

Asano et al.

[11] Patent Number: 4,697,008

[45] Date of Patent: Sep. 29, 1987

[54] PRODUCTION OF WATER-INSOLUBLE ALKALI METAL SALTS OF CARBOXYALKYL CELLULOSE

[75] Inventors: Hideharu Asano, Nakakubiki; Hisakazu Senda, Joyo, both of Japan

[73] Assignee: Dai-Ichi Kogyo Seiyaku Co., Ltd., Kyoto, Japan

[21] Appl. No.: 940,420

[22] Filed: Dec. 11, 1986

[30] Foreign Application Priority Data

Dec. 13, 1985 [JP] Japan ................................ 60-281612

[51] Int. Cl.$^4$ .......................................... C08B 11/20
[52] U.S. Cl. ........................................ 536/89; 536/63
[58] Field of Search ................................ 536/89, 63

[56] References Cited

U.S. PATENT DOCUMENTS 3,375,245  3/1968  Dearborn et al. .................... 536/89

Primary Examiner—Paul R. Michl
Assistant Examiner—Alex H. Walker
Attorney, Agent, or Firm—Millen & White

[57] ABSTRACT

A method of producing a water-insoluble alkali metal salt of carboxyalkyl cellulose such as CMC is disclosed. The method comprises reacting a water-soluble alkali metal salt of carboxyalkyl cellulose with an aliphatic hydroxycarboxylic acid.

11 Claims, No Drawings

PRODUCTION OF WATER-INSOLUBLE ALKALI METAL SALTS OF CARBOXYALKYL CELLULOSE

BACKGROUND OF THE INVENTION

This invention relates to a method of producing water-insoluble alkali metal salts of carboxyalkyl cellulose.

Various methods have been known for producing a water-insoluble and water-absorptive material starting from a water-soluble alkali metal salt of carboxyalkyl cellulose by heating the water-soluble salt of carboxyalkyl cellulose in the presence of a strong acid such as hydrochloric acid, monochloroacetic acid or hydrochloric acid formed in situ upon heating monochloroacetic acid in the presence of water.

For example, Japanese Patent Publication No. 935/1979 discloses a method in which carboxyalkylation of cellulose is performed with an amount of alkali metal hydroxide and a slightly excess of carboxyalkylating agent relative to the alkali metal hydroxide, followed by heating the reaction mixture. A part of excessive carboxyalkylating agent which remained unreacted during the initial carboxyalkylation step is decomposed in the subsequent step to form hydrogen chloride which serves to catalyze the insolubilizing reaction of carboxyalkyl cellulose.

U.S. Pat. No. 3,723,413 discloses a method in which the initial carboxyalkylation reaction is performed conventhionally to form water-soluble carboxyalkyl cellulose. Then a portion of the carboxyalkylating reactants and by-products formed during the carboxyalkylation reaction is removed from the reaction mixture, and the resulting carboxyalkyl cellulose containing the remaining carboxyalkylating reactants and by-products is heat-treated at an elevated temperature for a sufficient period time for rendering the carboxyalkyl cellulose water-insoluble. This method also utilizes hydrogen chloride formed by the decomposition of monochloroacetic acid in situ for catalyzing the insolubilizing reaction.

These known methods suffer from certain disadvantages. Since the carboxyalkylating agent and hydrogen chloride formed in situ are of highly corrosive nature at an elevated temperature, the reaction must be carried out in an apparatus made of expensive alloys having high corrosion resistance. This is because the carboxyalkylation reaction includes a strong alkaline stage and thus conventional glass-lined reactors cannot be used. Even with such corrosion-resistant materials, the apparatus is susceptible to corrosion to an appreciable degree.

The method disclosed in the above cited U.S. patent calls for the step of removing a portion of the carboxyalkylating reactants and by-products formed during the initial carboxyalkylation reaction.

In order to attain a uniform quality in the final product, the amount of the reactants and by-products carried over to the next heat-treatment step should be controlled as constant as possible relative to the carboxyalkyl cellulose to be treated. Experiments have shown, however, that this control is rather difficult to achieve and the final product tends to vary in quality from batch to batch. Finally, since the treating temperature is relatively high, e.g. from 120° C. to 195° C., water and other volatile liquids must be driven off prior to the heat-treatment. This requires not only a complicated operation and apparatus but also a large amount of energy consumption.

SUMMARY OF THE INVENTION

It is, therefore, an object of the invention to provide a method of producing water-insoluble alkali metal salts of carboxyalkyl cellulose which does not utilize highly corrosive chemicals for rendering the alkali metal salts of carboxyalkyl cellulose water-insoluble.

Another object of the invention is to provide the method in which no intermediate processing is required between the initial carboxyalkylating step and the insolubilizing step for isolating water-soluble carboxyalkyl cellulose or removing the remaining reactants and by-products from the reaction mixture.

A further object of the present invention is to provide the method in which the insolubilizing reaction is carried out at a temperature substantially lower than used in the known methods.

Other objects and advantages of the present invention will become apparent as the description proceeds.

According to the present invention, there is provided a method of producing a water-insoluble alkali metal salt of carboxyalkyl cellulose comprising reacting a water-soluble alkali metal salt of carboxyalkyl cellulose with an aliphatic hydroxycarboxylic acid. Preferably, the starting water-soluble alkali metal salt of carboxyalkyl cellulose has a degree of substitution of 0.4 to 1.0.

Preferably, the reaction is carried out by adding the aliphatic hydroxycarboxylic acid to a reaction mixture containing the water-soluble alkali metal salt of carboxyalkyl cellulose, and heating the mixture at a temperature of 65° to 95° C., more preferably 70° to 90° C. for 30 to 90 minutes. The amount of the hydroxycarboxylic acid to be reacted varies with the degree of substitution of the starting alkali metal salt of carboxyalkyl cellulose and generally ranges 0.4 to 1.8 times, more preferably 0.5 to 1.5 times in equivalent as free acid relative to the degree of substitution.

DETAILED DISCUSSION

The starting water-soluble alkali metal salt of carboxyalkyl cellulose may be prepared in the known manner by reacting a cellulosic material with a carboxyalkylating agent and an alkali metal hydroxide in a water-containing organic solvent.

Examples of cellulosic materials include cotton linter pulp, wood pulp and other fibrous cellulosic materials conventionally used in the production of carboxyalkyl cellulose.

Examples of alkali metal hydroxides includes sodium hydroxide and potassium hydroxide. Sodium hydroxide is preferable for economical and reactivity reasons. The amount of alkali metal hydroxide should be equal or slightly excess to the carboxyalkylating agent on molar basis. Usually an excess of 0.1 to 0.4 moles is used. The use of alkali metal hydroxide serves not only to complete the carboxyalkylation reaction smoothly in a short period of time by increasing the availability of carboxyalkylating agent to the reaction, but also to diminish the amount of unreacted carboxyalkylating agent upon the completion of the reaction to thereby prevent corrosion of the reaction apparatus.

Examples of carboxyalkylating agents include monochloroacetic acid, monochloropropionic acid, their alkali metal salt and lower alkyl esters. Monochloroacetic acid is preferable. The amount of carboxyalkylating agent is such that a number of carboxyalkyl groups are retained by the final product sufficient to exhibit desired water-absorptive and other properties. An amount sufficient to give a degree of substitution from 0.4 to 1.0 is generally preferable. The term "degree of substitution" as used herein refers to the average number of carboxyalkyl groups per anhydroglucose unit. At a degree of substitution less than 0.4, the final product does not exhibit desirably high water-adsorptive properties. Conversely excessively high degree of substitution is not desirable because the starting material is too hydrophilic to insolubilize with a reasonable amount of insolubilizing agent at a reasonable reaction temperature and reaction time.

The carboxyalkylation reaction is carried out in a water-containing reaction medium. Aqueous mixtures of water-miscible organic solvents such as $C_{1-4}$ alkanols or ketones optionally containing water-immiscible organic solvents such as benzene or hexane may be used. Constituents and proportions of the reaction medium used for the carboxyalkylating reaction is well-known in the art.

Examples of aliphatic hydroxycarboxylic acids includes monohydroxy-monocarboxylic acids such as glycolic acid and lactic acid; monohydroxy-dicarboxylic acids such as malic acid, tartronic acid, and methyltartronic acid; monohydroxy-tricarboxylic acid such as citric acid; and dihydroxy-dicarboxylic acid such as tartaric acid. Isomers of these acids may also be used. These acids have a high boiling point. Thus they do not vaporize during the reaction with water-soluble alkali metal salts of carboxyalkyl cellulose, nor do they corrode the reaction apparatus.

The amount of hydroxycarboxylic acid is such that it corresponds to 0.4 to 1.8 times, preferably 0.5 to 1.5 times in equivalent to the degree of substitution of the starting water-soluble alkali metal salt of carboxyalkyl cellulose. This amount must be present in free acid form and thus an amount of the acid necessary to neutralize remaining alkali should be exclude. The above range gives a final product having desired water-insolubilities and water-absorbabilities. The insolubilizing hydroxycarboxylic acid may be directly added to the reaction mixture resulting from the carboxyalkylation reaction of cellulose as described hereinbefore. Isolation and/or removal of any component from the reaction mixture is not necessary. The insolubilizing reaction is carried out at a temperature from 65° to 95° C., preferably from 70° to 90° C. The reaction time varies depending upon the degree of substitution of the starting material, the amount of hydroxycarboxylic acid and the properties desired in the final product. It generally ranges from 30 to 90 minutes. Excessive reaction time often decreases the water-absorbability undesirably.

Since the reaction is carried out at a relatively low temperature for a relatively short period of time in the absence of any strongly corrosive chemical, conventional equipment of the type used in the production of carboxyalkyl cellulose by the low volume-solvent method may be employed as such without modification.

The resulting water-insoluble alkali metal salt of carboxyalkyl cellulose is hardly soluble but swellable in water and has excellent water absorption and retention properties. Accordingly, the product is useful, for example, as water absorbent materials and also as a disintegrating agent for medicinal tablets.

The following examples will illustrate the invention. All parts and percents therein are by weight unless otherwise indicated.

EXAMPLE 1

A reaction vessel was charged with 200 parts of cotton linter pulp and 86 parts of sodium hydroxide dissolved in 800 parts of 83% isopropanol. The mixture was stirred at 30° C. for 50 minutes to form alkali cellulose.

Then 190 parts of a 50% solution of monochloroacetic acid in isopropanol were added to the reactor while maintaining the inner temperature below 40° C. Then the mixture was stirred for 30 minutes, heated to reflux over 25 minutes and allowed to react at the same temperature for 65 minutes with stirring. The degree of substitution (D.S.) was 0.69 at the end of reaction.

To the reaction vessel were added 84.3 parts of malic acid (1.41 equivalents/D.S.) and the mixture was allowed to react at 80° C. for 60 minutes with stirring. After the reaction, the resulting product was centrifuged to remove the solvent, washed with 60% methanol 3 times and finally with absolute methanol, dried and pulverized. Properties of the final product are shown in Table 1.

EXAMPLES 2, 3 AND 4

The procedure of Example 1 was repeated except that 136 parts of 50% glycolic acid (0.95 equivalents/D.S.), 105 parts of citric acid (1.71 equivalents/D.S.) and 94 parts of tartaric acid (1.40 equivalents/D.S.) were replaced for malic acid in Examples 2, 3 and 4, respectively.

The properties of products obtained in these examples are shown in Table 1.

EXAMPLE 5

A reaction vessel was charged with 200 parts of cotton linter pulp and 102 parts of sodium hydroxide dissolved in 850 parts of 83% isopropanol. The mixture was stirred at 30° C. for 50 minutes to form alkali cellulose.

Then 208 parts of a 50% solution of monochloroacetic acid in isopropanol were added to the reactor while maintaining the inner temperature below 37° C. Then the mixture was stirred for 30 minutes, heated to reflux over 25 minutes and allowed to react at the same temperature for 65 minutes with stirring. The degree of substitution (D.S.) was 0.74 at the end of reaction.

To the reaction vessel were added 58 parts of malic acid (0.61 equivalents/D.S.) and the mixture was allowed to react at 90° C. for 90 minutes with stirring.

After the reaction, the resulting product was processed as in Example 1. Properties of this product are shown in Table 1.

COMPARATIVE EXAMPLE

The procedure of Example 1 was repeated except that 48 parts of monochloroacetic acid were replaced for 84.3 parts of malic acid. Properties of the final product are shown in Table 1.

TABLE 1

| | Ex. 1 | Ex. 2 | Ex. 3 | Ex. 4 | Ex. 5 | Comparative Example |
|---|---|---|---|---|---|---|
| Solubility in $H_2O$ (%) | 3.88 | 5.30 | 1.40 | 9.96 | 14.7 | 2.76 |

TABLE 1-continued

|  | Ex. 1 | Ex. 2 | Ex. 3 | Ex. 4 | Ex. 5 | Comparative Example |
| --- | --- | --- | --- | --- | --- | --- |
| Absorptive capacity (ml/g) | 8.7 | 25.3 | 9.3 | 9.3 | 62.7 | 25.7 |
| Disintegration time (second) | 40–53 | 20–33 | 45–57 | 28–48 | 13–18 | 45–70 |
| Corrosiveness (mg/cm$^2$ · month) | | | | | | |
| SUS 304 | 0.33 | 0.51 | 0.49 | 0.63 | 0.34 | 13.6 |
| SUS 316 | 0.29 | 0.36 | 0.36 | 0.47 | 0.29 | 4.8 |

TEST METHODS

Solubility in Water

A sample weighing about 4 g is taken after purifying and drying, weighed precisely ($W_1$) and dissolved in 400 g of distilled water with stirring for 30 minutes using a magnetic stirrer. After allowing to stand for 60 minutes, the resulting supernatant is filtered through a quantitative filter paper. 200 ml of the filtrate is collected, weighed ($W_2$) and evaporated to dryness. The residue is further dried in an oven at 105° C. for 4 hours and weighed ($W_3$).

The volatile content in % ($W_4$) of the same sample is determined separately after drying the sample at 105° C. for 4 hours.

The solubility in water may be calculated according to the following equation:

$$\text{Solubility} = \frac{W_3 \times (400 + W_1)}{W_1 \times W_2 \times [1 - (0.01 \times W_4)]} \times 100$$

Absorptive Capacity 75 ml of distilled water is placed in a 100 ml measuring cylinder. A sample weighing just 1.5 g is added portionwise in three times and dispersed in the distilled water every time. An amount of distilled water is added so that the total volume is 100 ml. Then the dispersion is allowed to stand at room temperature for 4 hours and the volume of the resulting sedimentation is noted. The absorptive capacity may be calculated according to the following equation:

$$\text{Absorptive capacity} = \frac{\text{Volume of sedimentation (ml)}}{1.5 \text{ (g)}}$$

Disintegration Time

A tablet having a diameter of 8 mm and weighing 250 mg is compressed from the following mixture and tested on the disintegration time according to the Japanese Pharmacopeia.

| Ascorbic Acid | 50.0% |
| --- | --- |
| Lactose | 46.5% |
| Disintegrating agent | 3.0% |
| Magnesium stearate | 0.5% |
| Total | |

Corrosiveness

A sample of the reaction mixture is taken from the reaction vessel when 5 minutes has elapsed after adding each acid and stirring. A test piece is placed in the sample liquid in a sealed container and maintained at 78° C. in a bath for 1 month. The test piece is then removed from the container, thoroughly washed with water, dried and weighed. The corrosiveness may be calculated by dividing the weight loss of the test piece by its surface area.

As is apparent from Table 1, the products of Examples 1 through 5 exhibit properties in terms of water-solubility, absorptive capacity and disintegration time comparable to or better than the product of Comparative Example. Furthermore, hydroxycarboxylic acid used in these examples are less corrosive than monochloroacetic acid. Most of these hydroxycarboxylic acids have been accepted as a food additive and are safe even if remained in the final product.

We claim:

1. A method of producing a water-insoluble alkali metal salt of carboxyalkyl cellulose which comprises reacting a water-soluble alkali metal salt of carboxyalkyl cellulose with an aliphatic hydroxycarboxylic acid.

2. The method according to claim 1, wherein said water-soluble alkali metal salt of carboxyalkyl cellulose has a degree of substitution from 0.4 to 1.0.

3. The method according to claim 1, wherein said alkali metal salt of carboxyalkyl cellulose is sodium salt of carboxymethyl cellulose.

4. The method according to claim 1, wherein said hydroxycarboxylic acid is glycolic acid, lactic acid, malic acid, tartronic acid, methyltartronic acid, citric acid or tartaric acid.

5. The method according to claim 2, wherein said hydroxycarboxylic acid amounts from 0.4 to 1.8 times in equivalent as free acid relative to said degree of substitution.

6. A method of producing a water-insoluble alkali metal salt of carboxyalkyl cellulose which comprises the steps of:
   reacting a cellulosic material with a carboxyalkylating agent and an alkali metal hydroxide in a water-containing organic solvent;
   adding an aliphatic hydroxycarboxylic acid to the resulting reaction mixture and heating the mixture at a temperature of 65° to 95° C. for 30 to 90 minutes; and recovering the water-insoluble alkali metal salt of carboxyalkyl cellulose from the reaction mixture.

7. The method according to claim 6, wherein said carboxyalkylating agent is monochloroacetic acid and said alkali metal hydroxide is sodium hydroxide.

8. The method according to claim 6, wherein said organic solvent is isopropanol.

9. The method according to claim 6, wherein said alkali metal salt of carboxyalkyl cellulose has a degree of substitution from 0.4 to 1.0.

10. The method according to claim 6, wherein said hydroxycarboxylic acid is glycolic acid, lactic acid, malic acid, tartronic acid, methyltartronic acid, citric acid or tartaric acid.

11. The method according to claim 9, wherein said hydroxycarboxylic acid amounts from 0.4 to 1.8 times in equivalent as free acid relative to said degree of substitution.

* * * * *